United States Patent
Miura et al.

(10) Patent No.: US 9,699,210 B2
(45) Date of Patent: Jul. 4, 2017

(54) DATA PROCESSING DEVICE THAT EXECUTES VIRUS COUNTERMEASURE PROCESSING, DATA PROCESSING METHOD, AND RECORDING MEDIUM STORING A DATA PROCESSING PROGRAM

(71) Applicant: FUJITSU LIMITED, Kawasaki-shi, Kanagawa (JP)

(72) Inventors: Tomohiro Miura, Itabashi (JP); Syouichi Kamio, Yokohama (JP); Satoru Fukuda, Yokohama (JP); Kaoru Iguchi, Kawasaki (JP); Yoshikazu Takahashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 13 days.

(21) Appl. No.: 14/667,018

(22) Filed: Mar. 24, 2015

(65) Prior Publication Data

US 2015/0195292 A1 Jul. 9, 2015

Related U.S. Application Data

(63) Continuation of application No. PCT/JP2012/074803, filed on Sep. 26, 2012.

(51) Int. Cl.
*G06F 21/00* (2013.01)
*H04L 29/06* (2006.01)
*G06F 21/56* (2013.01)

(52) U.S. Cl.
CPC .......... *H04L 63/145* (2013.01); *G06F 21/567* (2013.01)

(58) Field of Classification Search
CPC ....................... G06F 21/50; G06F 21/55–21/56
(Continued)

(56) References Cited

U.S. PATENT DOCUMENTS 5,918,008 A 6/1999 Togawa et al.
5,951,698 A 9/1999 Chen et al.
(Continued)

FOREIGN PATENT DOCUMENTS

JP 8-328846 12/1996
JP 2001-508564 6/2001
(Continued)

OTHER PUBLICATIONS

International Search Report mailed Dec. 11, 2012 in corresponding International Application No. PCT/JP2012/074803.
(Continued)

*Primary Examiner* — Anthony Brown
(74) *Attorney, Agent, or Firm* — Staas & Halsey LLP

(57) ABSTRACT

A data processing device, that includes: a first storage device; and a processor configured to execute a procedure. The procedure includes: receiving write data to be written to a second storage device provided at a computer, outputting the write data to the second storage device, and duplicating and outputting the write data; executing control that writes the duplicated write data to the first storage device that is separate from the second storage device; executing virus countermeasure processing related to virus infection, on the write data stored in the first storage device; and in a case where the write data is output while executing the virus countermeasure processing, suspending the virus countermeasure processing and prioritizing execution of the control that writes the duplicated write data to the first storage device.

15 Claims, 13 Drawing Sheets

(58) Field of Classification Search
USPC .................................................. 726/22–25
See application file for complete search history.

(56) References Cited

U.S. PATENT DOCUMENTS

| | | |
|---|---|---|
| 7,538,772 B1 | 5/2009 | Fouladi et al. |
| 2006/0242686 A1 | 10/2006 | Toda et al. |
| 2007/0074290 A1 | 3/2007 | Kobayashi et al. |
| 2007/0094539 A1 | 4/2007 | Nakatsuka et al. |
| 2007/0168707 A1* | 7/2007 | Kern ............... G06F 11/1435 714/6.12 |
| 2007/0283438 A1 | 12/2007 | Fries et al. |
| 2009/0204613 A1 | 8/2009 | Muroi |
| 2010/0083381 A1 | 4/2010 | Khosravi et al. |
| 2011/0099636 A1* | 4/2011 | Tsai ............... G06F 21/78 726/24 |

FOREIGN PATENT DOCUMENTS

| | | |
|---|---|---|
| JP | 2002-189629 | 7/2002 |
| JP | 2004-528651 | 9/2004 |
| JP | 2007-94803 | 4/2007 |
| JP | 2007-122109 | 5/2007 |
| JP | 2009-15864 | 1/2009 |
| JP | 2009-193203 | 8/2009 |
| JP | 2009-539177 | 11/2009 |
| JP | 2010-86538 | 4/2010 |
| WO | WO 02/086717 A1 | 10/2002 |

OTHER PUBLICATIONS

Patent Abstracts of Japan, Publication No. 2010-86538, published Apr. 15, 2010.
Patent Abstracts of Japan, Publication No. 8-328846, published Dec. 13, 1996.
Patent Abstracts of Japan, Publication No. 2007-94803, published Apr. 12, 2007.
Patent Abstracts of Japan, Publication No. 2009-193203, published Aug. 27, 2009.
Patent Abstracts of Japan, Publication No. 2009-15864, published Jan. 22, 2009.
Espacenet English Abstract of Japanese Publication No. 2001-508564, published Jun. 26, 2001.
Espacenet English Abstract of Japanese Publication No. 2004-528651, published Sep. 16, 2004.
Patent Abstracts of Japan, Publication No. 2007-122109, published May 17, 2007.
Espacenet English Abstract of Japanese Publication No. 2009-539177, published Sep. 12, 2009.
Patent Abstracts of Japan, Publication No. 2002-189629, published Jul. 5, 2002.

* cited by examiner

FIG.12

| EXECUTION SEQUENCE | EXECUTION CONTENT | EXECUTION QUEUE STATE |
|---|---|---|
| 1 | WRITE INSTRUCTION (A) RECEIVED | EMPTY |
| 2 | WRITE INSTRUCTION (A) EXECUTING | EMPTY |
| | READ INSTRUCTION (B) RECEIVED | (B) |
| 3 | WRITE INSTRUCTION (C) RECEIVED | (B) |
| 4 | WRITE INSTRUCTION (C) EXECUTING | (B) |
| | READ INSTRUCTION (D) RECEIVED | (B), (D) |
| 5 | READ INSTRUCTION (B) EXECUTING | (D) |
| | READ INSTRUCTION (E) RECEIVED | (D), (E) |
| 6 | READ INSTRUCTION (D) EXECUTING | (E) |
| 7 | READ INSTRUCTION (E) EXECUTING | EMPTY |

DATA PROCESSING DEVICE THAT EXECUTES VIRUS COUNTERMEASURE PROCESSING, DATA PROCESSING METHOD, AND RECORDING MEDIUM STORING A DATA PROCESSING PROGRAM

CROSS-REFERENCE TO RELATED APPLICATION

This application is a continuation of application of International Application No. PCT/JP2012/074803, filed Sep. 26, 2012, the disclosure of which is incorporated herein by reference in its entirety.

FIELD

A certain aspect of the embodiments discussed herein is related to a data processing device, a data processing method, and a recording medium storing a data processing program.

BACKGROUND

When performing business processing employing a computer, data to be employed is stored on a storage device such as a hard disk drive (HDD), and then employed. Virus countermeasure processing is executed on the storage device in order to suppress occurrences of damage to business processing. Virus detection software installed on the computer is generally employed in virus countermeasure processing on the storage device of the computer. The virus detection software uses hardware resources of the computer, for example, a CPU and memory, and detects viruses stored on the storage device.

When computer hardware resources, such as a CPU and memory, are used to execute virus countermeasure processing, the hardware resources of the computer are occupied by processing other than business processing. Consequently, executing virus countermeasure processing in addition to business processing sometimes causes access to storage devices other than for business processing to occur, exerting a load on the computer, and slowing down business processing.

Technology is known in which the virus countermeasure processing is executed using a CPU and memory independent from the computer subject to virus countermeasure processing, in order to reduce load on the computer while executing the virus countermeasure processing. For example, technology is known in which a device for virus countermeasure processing provided with a CPU and memory, separate from the hardware resources of a computer, is connected as a relay to a storage device. Technology is also known relating to a storage device that includes a CPU, memory, a file distribution manager, and the like for virus countermeasure processing, separate from the hardware resources of the computer. Technology is also known in which, for a storage device containing a normal and an ancillary-volume, the normal volume is separated from the ancillary-volume, and virus countermeasure processing is executed on the disconnected ancillary-volume.

RELATED PATENT DOCUMENTS

Patent Document 1: Japanese Patent Application Laid-Open (JP-A) No. 2010-86538
Patent Document 2: JP-A No. H08-328846
Patent Document 3: JP-A No. 2007-94803
Patent Document 4: JP-A No. 2009-193203
Patent Document 5: JP-A No. 2009-15864

SUMMARY

According to an aspect of the embodiments, a data processing device includes: a first storage device; and a processor configured to execute a procedure. The procedure includes: receiving write data to be written to a second storage device provided at a computer, outputting the write data to the second storage device, and duplicating and outputting the write data; executing control that writes the duplicated write data to the first storage device that is separate from the second storage device; executing virus countermeasure processing related to virus infection, on the write data stored in the first storage device; and in a case where the write data is output while executing the virus countermeasure processing, suspending the virus countermeasure processing and prioritizing execution of the control that writes the duplicated write data to the first storage device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is an illustrative diagram illustrating an example of a processing process state of a priority sequence determination section.

DESCRIPTION OF EMBODIMENTS

Explanation follows below regarding exemplary embodiments of technology disclosed herein, with reference to the drawings.

First Exemplary Embodiment

Figure 1:
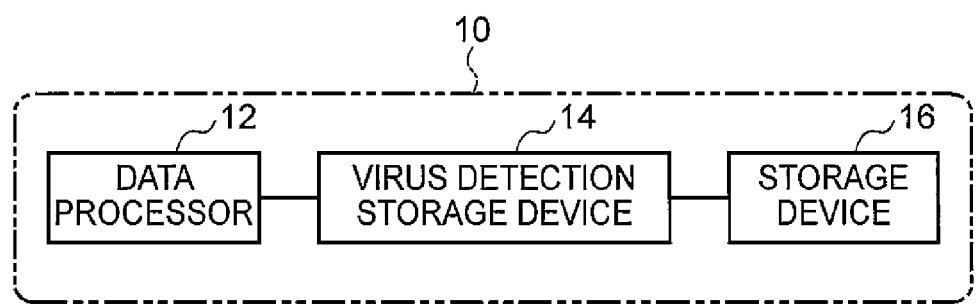
FIG. 1 is a block diagram illustrating an example of a data processing system according to a first exemplary embodiment.

FIG. 1 illustrates a configuration of a data processing system 10 according to a first exemplary embodiment. The data processing system 10 includes a data processor 12, a virus detection storage device 14, and a storage device 16 such as a HDD. Although FIG. 1 illustrates an example provided with a single unit of the storage device 16, there is no limitation to a single unit of the storage device 16, and plural units of a storage device may be included.

The data processing system 10 includes, for example, the data processor 12 that is the main computing body, and the storage device 16, connected to the data processor 12 that is the main computing body, for storing data handled by the data processor 12. The virus detection storage device 14 is provided between the data processor 12 that is the main computing body, and the storage device 16 connected to the data processor 12 that is the main computing body.

Figure 2:
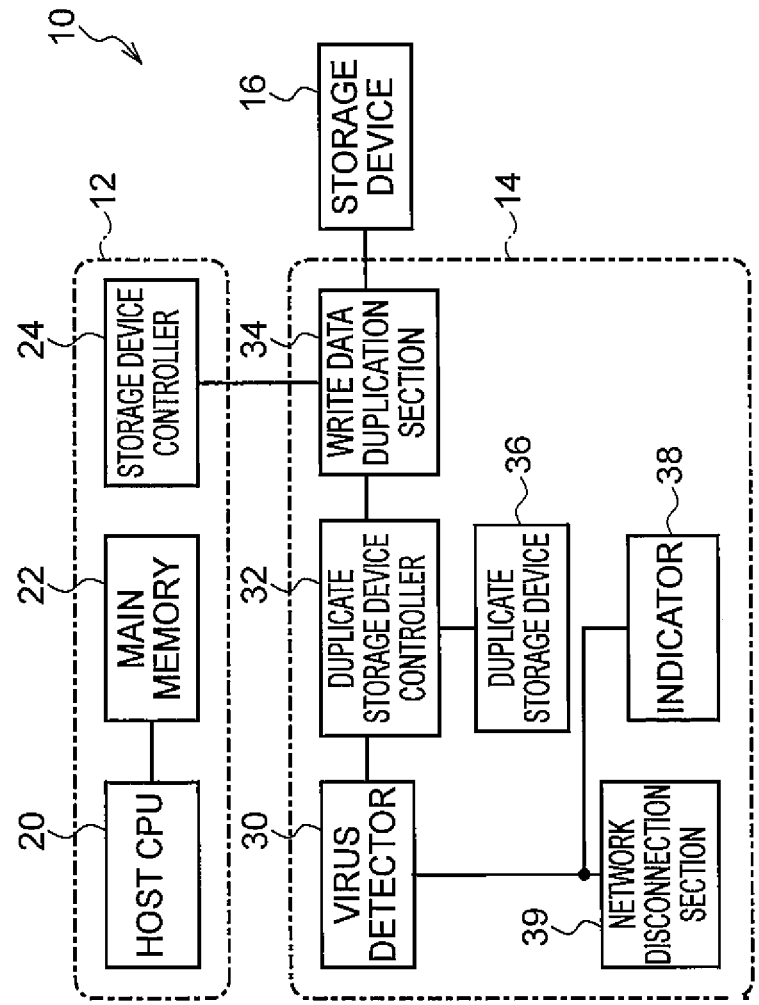
FIG. 2 is a block diagram illustrating an example of a data processing system.

FIG. 2 illustrates an example of a functional block configuration of the data processing system 10. The data processor 12 is mainly configured by a host CPU 20, main memory 22, and a storage device controller 24. In the data processor 12, various types of business processing are executed due to the host CPU 20 expanding various programs into the main memory 22, and executing the various programs. When the various types of business processing are executed, data exchange with the storage device 16 is executed under control of the storage device controller 24.

So as not to influence functionality with respect to data input/output of the storage device 16, the virus detection storage device 14 is configured capable of executing virus countermeasure processing independently from the data processor 12 that is the main computing body, and the storage device 16. Virus scanning processing to detect viruses is a known example of virus countermeasure processing.

The virus detection storage device 14 includes a virus detector 30, a duplicate storage device controller 32, and a write data duplication section 34. The write data duplication section 34 is connected to the virus detector 30 through the duplicate storage device controller 32. The duplicate storage device controller 32 is connected to a duplicate storage device 36, such as a HDD. The write data duplication section 34 is also connected to the storage device controller 24, and the storage device 16.

Virus countermeasure processing such as virus scanning is, for example, executed in the virus detection storage device 14 so as not to influence functionality related to data input/output to the storage device 16. Write data for the storage device 16, output from the storage device controller 24 of the data processor 12, is duplicated by the write data duplication section 34, and stored in the duplicate storage device 36 through the duplicate storage device controller 32. The virus detector 30 executes virus countermeasure processing, such as virus scanning, on the duplicate storage device 36 asynchronously, and in parallel with, business processing in the data processing system 10.

Write processing of write data duplicated by the write data duplication section 34 in the virus detection storage device 14 is processing that takes priority over read processing of data from the duplicate storage device 36 during virus countermeasure processing, such as virus scanning. Up-to-date data of the storage device 16 is accordingly reflected in the duplicate storage device 36, and virus countermeasure processing is executed on the duplicate storage device 36 that reflects the up-to-date data.

The virus detector 30 is connected to an indicator 38 for informing the user of detected abnormalities when abnormalities are detected, such as a virus detected during virus countermeasure processing. The virus detector 30 is connected to a network disconnection section 39 for preventing data leaks and virus spreading when an abnormality is detected, such as a virus is detected virus countermeasure processing. When an abnormality is detected, such as a virus detected during virus countermeasure processing, the virus detector 30 causes the indicator 38 to operate, and causes the network disconnection section 39 to operate. Data leaks and virus spreading are prevented since detected abnormalities are notified to the user by operation of the indicator 38, and connections to networks are disconnected by the operation of the network disconnection section 39.

The virus detection storage device 14 is an example of a data processing device of technology disclosed herein. The write data duplication section 34 is an example of a duplicate output section of technology disclosed herein, and the duplicate storage device controller 32 is an example of a controller and a priority processor of technology disclosed herein. The virus detector 30 is an example of a countermeasure processor of technology disclosed herein.

Figure 3:
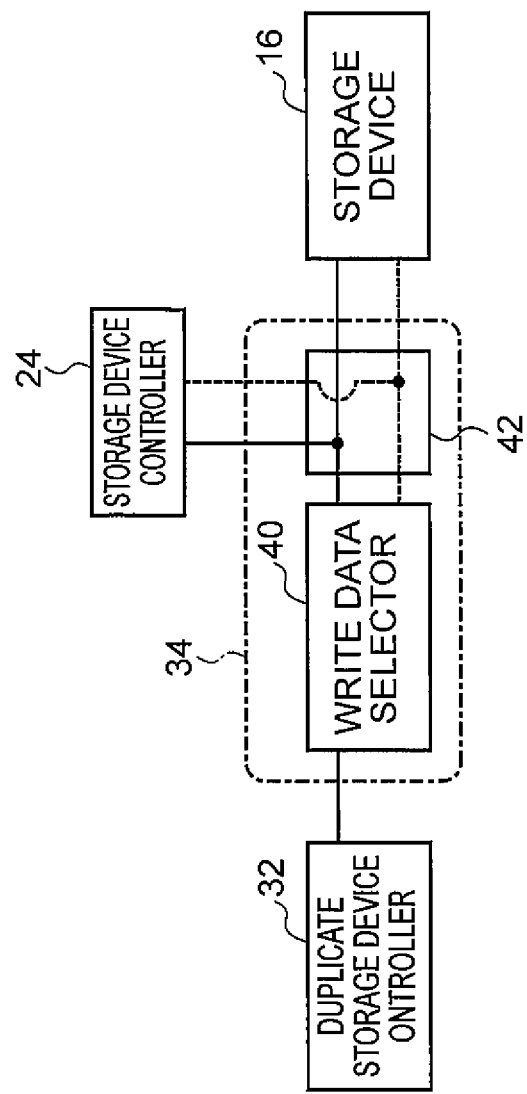
FIG. 3 is a block diagram illustrating an example of a write data duplication section.

FIG. 3 illustrates a configuration of the write data duplication section 34. The write data duplication section 34 includes a write data selector 40 and a distributor 42. The distributor 42 distributes data output from the storage device controller 24 to the storage device 16 and the write data selector 40. In FIG. 3, inter-connections that carry write data are illustrated by solid lines, and inter-connections that carry read data are illustrated by dotted lines. Out of the input data, the write data selector 40 outputs only the write data to the duplicate storage device controller 32.

For example, in order to execute reading/writing of data on the storage device 16 in business processing, the data processor 12 outputs data requesting data reading/writing (for example, instructions) from the storage device controller 24. After duplication in the distributor 42, data output from the storage device controller 24 is discriminated by the write data selector 40 as write data or not write data. When the input data is write data, the write data selector 40 outputs the input data, namely, the write data, to the duplicate storage device controller 32. When the input data is unrelated to write data, the write data selector 40 discards the input data. By the distributor 42 outputting regardless of the type of data output from the storage device controller 24, there is no influence on the read processing or write processing to the storage device 16. An example of discrimination as write data or not write data is implementing a determination as to whether a command is an advanced technology attachment (ATA) WRITE command. Another example of discrimination as write data or not write data is implementing a determination as to whether a command is a small computer system interface (SCSI) WRITE command.

Figure 4:
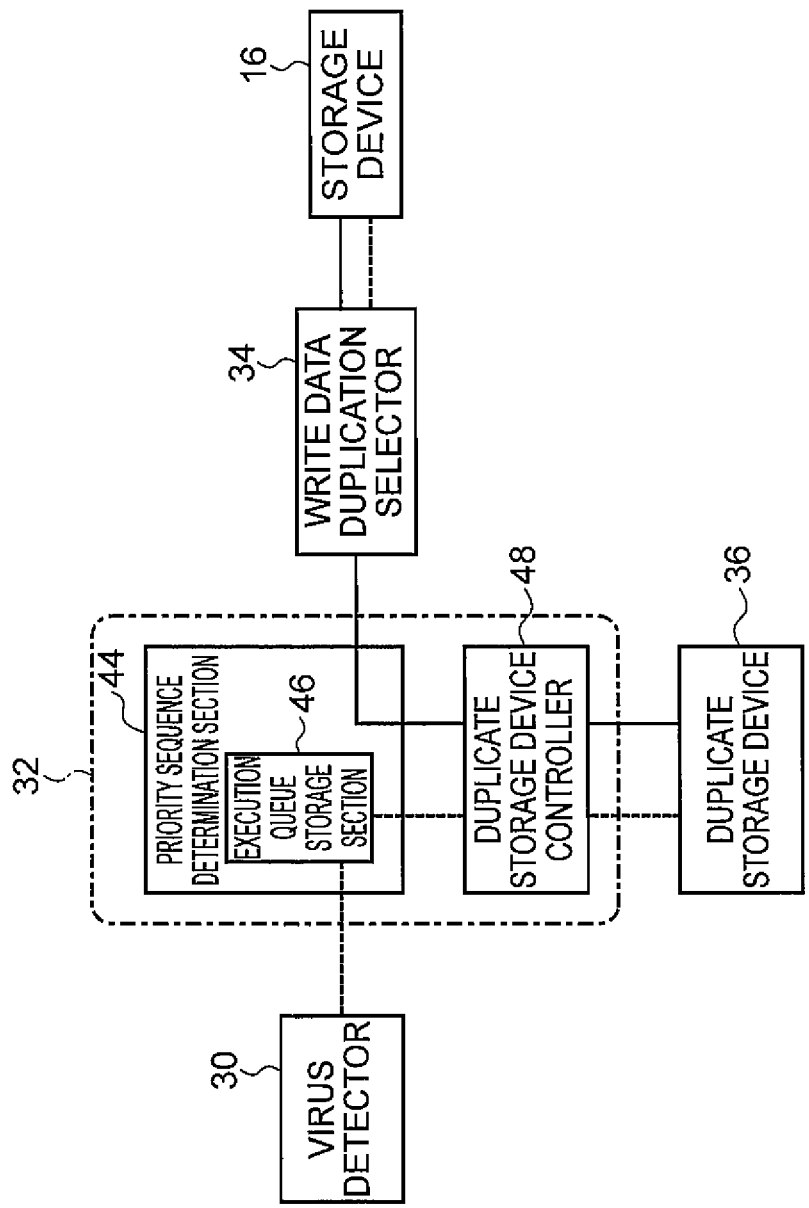
FIG. 4 is a block diagram illustrating an example of a duplicate storage device controller.

FIG. 4 illustrates an example of a configuration of the duplicate storage device controller 32. The duplicate storage device controller 32 includes a priority sequence determination section 44, and a duplicate storage device controller 48 that controls the duplicate storage device 36. The priority sequence determination section 44 includes an execution queue storage section 46, and executes priority sequence determination processing for prioritized processing of duplicated write data in the write data duplication section 34.

Namely, the duplicate storage device controller 32 is connected to the write data duplication section 34 or the virus detector 30, and controls read processing and write processing for the duplicate storage device 36. In the first exemplary embodiment, the execution queue storage section 46 is employed in the priority sequence determination section 44, and the content of the storage device 16 is rapidly reflected in the duplicate storage device 36. Namely, write data output from the write data duplication section 34 is processed with priority. The execution queue storage section 46 stores data representing execution content for executing data reading/writing on the storage device 16. Storage of data in the execution queue storage section 46 is performed by storing data from the virus detector 30 on a first in first out basis. However, data from the write data duplication section 34 is output to the duplicate storage device controller 48 so as to be processed with priority without employing the execution queue storage section 46.

Figure 5:
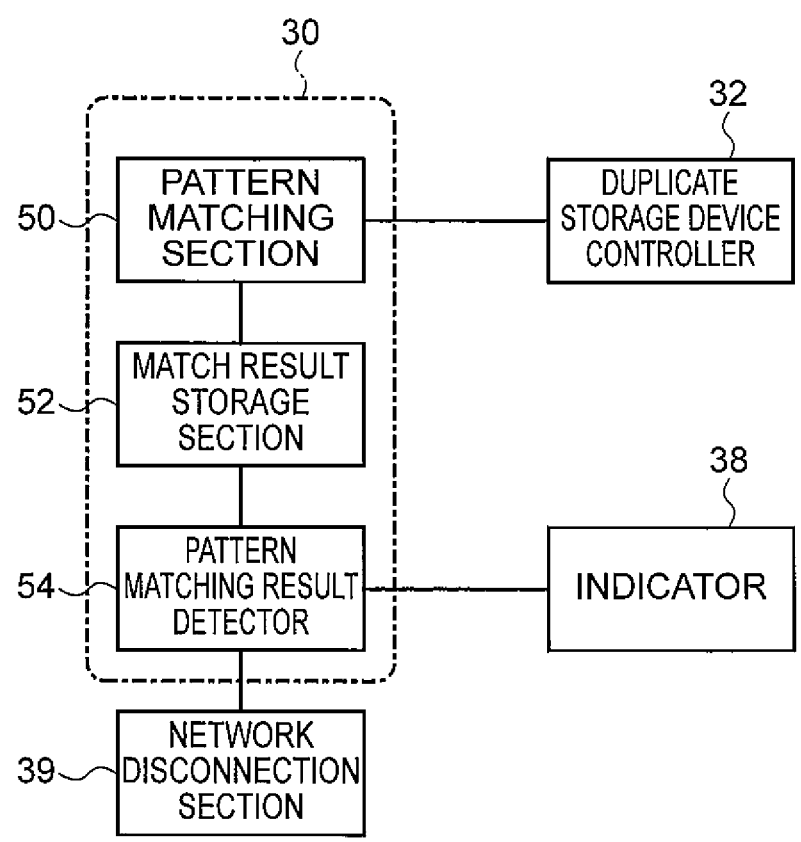
FIG. 5 is a block diagram illustrating an example of a virus detection section.

FIG. 5 illustrates an example of a configuration of the virus detector 30. The virus detector 30 includes a pattern matching section 50, a match result storage section 52, and a pattern matching result detector 54. The pattern matching section 50 matches virus patterns pre-stored in the duplicate storage device 36 to data stored in the duplicate storage device 36, and executes matching processing to detect data corresponding to virus patterns in the data stored in the duplicate storage device 36. The match result storage section 52 stores matching results from the pattern matching section 50. The pattern matching result detector reads data stored in the match result storage section 52, and makes notifications.

Figure 6:
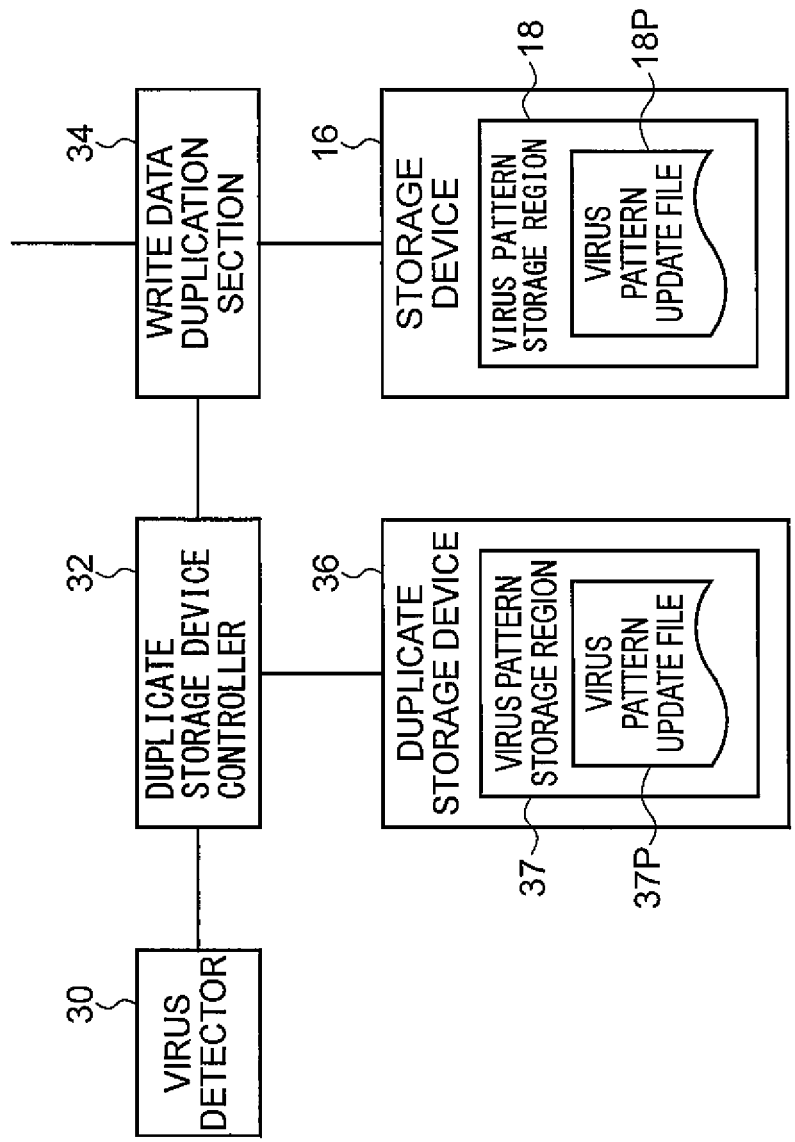
FIG. 6 is an explanatory diagram illustrating an example of virus pattern updating.

FIG. 6 illustrates an example of a configuration for storing up-to-date virus patterns in the duplicate storage device 36. Virus pattern update processing is executed in the data processor 12 in order to keep the virus patterns up-to-date. In the virus pattern update processing, the operation of the data processor 12 stores a virus pattern update file 18P in a virus pattern storage region 18 provided in the storage device 16. The write data duplication section 34 duplicates the virus pattern storage region 18 and the virus pattern update file 18P onto the duplicate storage device 36, as a virus pattern update file storage region 37 and a virus pattern update file 37P having the same contents.

The storage device that stores the data employed by the pattern matching section 50 may also perform the role of the match result storage section 52. The pattern matching section 50 may also perform the role of the pattern matching result detector 54. The virus detector 30 is not limited to virus detection using software, and a virus searching apparatus employing hardware may be applied. The processing of the virus detector 30 may be delegated to another computer through a network.

Figure 7:
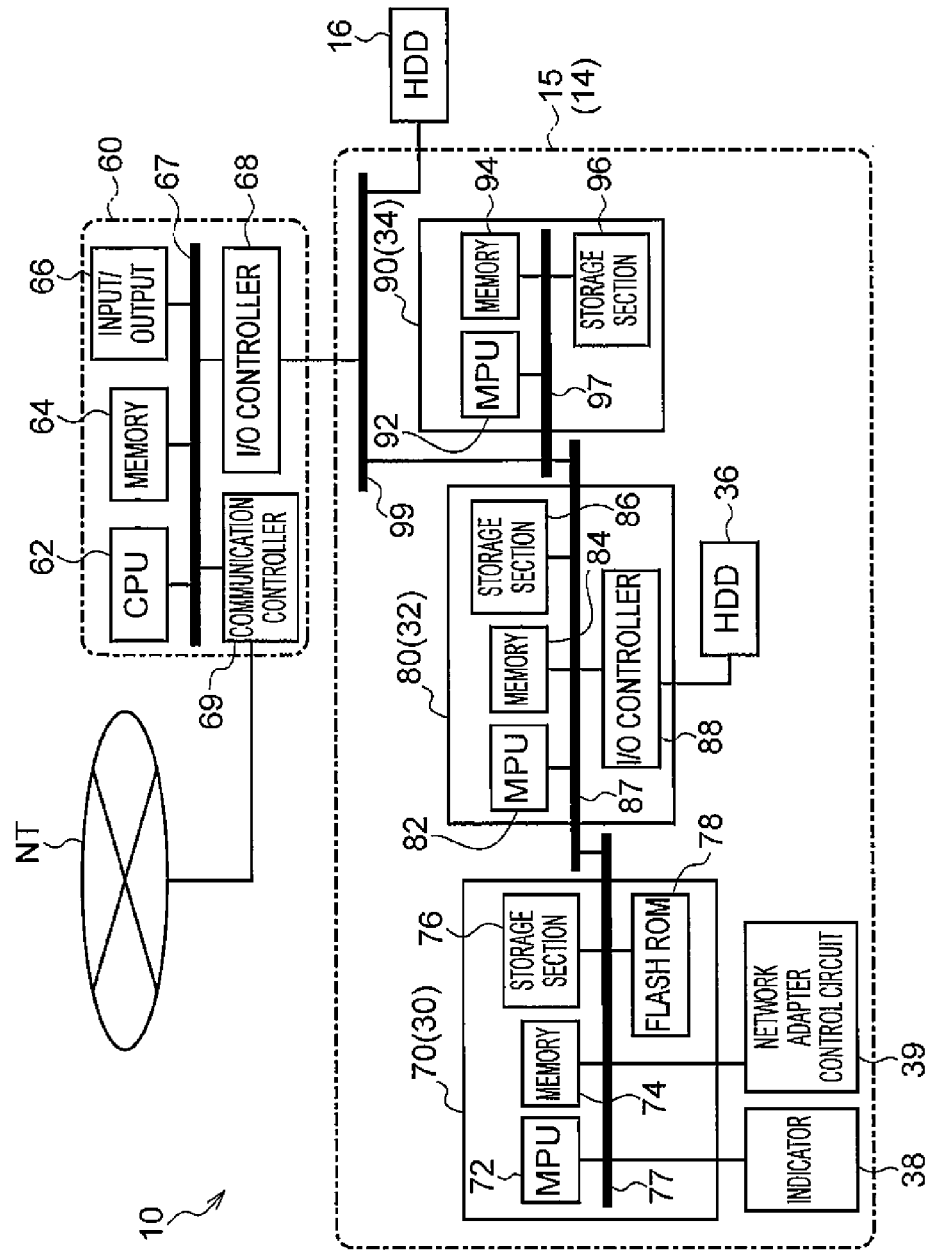
FIG. 7 is a block diagram illustrating an example in which a data processing system is implemented by a computer system.

FIG. 7 illustrates an example of a case in which the data processing system 10 is implemented by a computer system including a computer. The data processor 12 illustrated in FIG. 1 is implemented by a computer 60. The computer 60 includes a CPU 62, memory 64, and input/output devices 66. The CPU 62, the memory 64, and the input/output devices 66 are connected to a bus 67. The memory 64 is stored with application programs that carry out various types of business processing. The input/output devices 66 correspond to a display device serving as an example of an output device, and a keyboard, a mouse, or the like serving as examples of an input device. A recording medium such as an optical disc may be inserted, and a device for reading/writing the inserted recording medium may be included in the input/output devices 66. The input/output devices 66 may be omitted, or may be connected to the bus 67, as necessary.

The computer 60 includes a communication controller 69 for connection to a network NT, and the communication controller 69 is connected to the bus 67. The computer 60 also includes an I/O controller 68 for connecting to the storage device 16 (for example, a HDD) that stores data employed in business processing operating in the computer 60, and the I/O controller 68 is connected to the bus 67. The I/O controller 68 illustrated in FIG. 7 corresponds to the storage device controller 24 illustrated in FIG. 2. An application program is read from the memory 64 and executed by the CPU 62. Namely, the data processor 12 is implemented by the computer 60, and the computer 60 operates as the data processor 12 illustrated in FIG. 1 due to the CPU 62 executing the application program.

The virus detection storage device 14 illustrated in FIG. 1 is implemented by computer modules 15. Namely, the virus detector 30 included in the virus detection storage device 14 (FIG. 1), the duplicate storage device controller 32, and the write data duplication section 34 (FIG. 2) are each implemented by the computer modules 15. For example, the virus detector 30 illustrated in FIG. 2 is implemented by a virus detection module 70. The virus detection module 70 includes an MPU 72, memory 74, and a non-volatile storage section 76. The MPU 72, the memory 74, and the storage section 76 are mutually connected through a bus 77. The storage section 76 stores a virus detection program, and is implemented by a HDD, flash memory, or the like. The virus detection program is read from the storage section 76, expanded into the memory 74, and executed, by the MPU 72. Namely, the virus detector 30 is implemented by the virus detection module 70 that includes the MPU 72 that is a computer module, and the virus detection module 70 operates as the virus detector 30 due to the MPU 72 executing the virus detection program.

The virus detection module 70 includes flash ROM 78 that functions as the match result storage section 52 that stores the match results made by the pattern matching section 50. The flash ROM 78 is connected to the bus 77. Although FIG. 7 illustrates an example in which the storage section 76 and the flash ROM 78 are provided separately, either one of these may also perform the role of the other. For example, the storage section 76 may also perform the role of the flash ROM 78. The indicator 38 and the network disconnection section 39 (for example, a network adapter control circuit) are also connected to the bus 77.

As input/output devices, the virus detection module 70 may also be provided with a display device, serving as an example of an output device, and a keyboard, a mouse, or the like, serving as examples of an input device. The virus detection module 70 may be inserted with a recording medium such as an optical disc, may be provided with a device for reading/writing the inserted recording medium, and the device for reading/writing may be connected to the bus 77.

The duplicate storage device controller 32 illustrated in FIG. 2 is implemented by a duplicate storage device controller module 80. The duplicate storage device controller module 80 includes an MPU 82, memory 84, and a non-volatile storage section 86. The MPU 82, the memory 84, and the storage section 86 are mutually connected through a bus 87. The storage section 86 stores a duplicate storage device control program, and is implemented by a HDD, flash memory, or the like. The duplicate storage device control program is read from the storage section 86, expanded into the memory 84, and executed, by the MPU 82. Namely, the duplicate storage device controller 32 is implemented by the duplicate storage device controller module 80 and the duplicate storage device controller module 80 operates as the duplicate storage device controller 32 due to the MPU 82 executing the duplicate storage device control program.

The duplicate storage device controller module 80 includes an I/O controller 88 for connection to the duplicate storage device 36 (for example, a HDD) that stores target data of the virus countermeasure processing, and the I/O controller 88 is connected to the bus 87. The I/O controller 88 illustrated in FIG. 7 is an example of the memory 84 illustrated in FIG. 4.

As input/output devices, the duplicate storage device controller module 80 may be provided with a display device serving as an example of an output device, and a keyboard, a mouse, or the like serving as examples of an input device. The duplicate storage device controller module 80 may be inserted with a recording medium such as an optical disc, may include a device for reading/writing the inserted recording medium, and the device for reading/writing may be connected to the bus 87.

The write data duplication section 34 illustrated in FIG. 2 is implemented by a write data duplication module 90. The write data duplication module 90 includes an MPU 92, memory 94, and a non-volatile storage section 96. The MPU 92, the memory 94, and the storage section 96 are mutually connected through a bus 97. The storage section 96 stores a write data duplication program, and is implemented by a HDD, flash memory, or the like. The write data duplication program is read from the storage section 96, expanded into the memory 94, and executed, by the MPU 92. Namely, the write data duplication section 34 is implemented by the write data duplication module 90, and the write data duplication module 90 operates as the write data duplication section 34 due to the MPU 92 executing the write data duplication program.

The bus 97 of the write data duplication module 90 is connected to the I/O controller 68 through a bus 99 of the computer modules 15. The storage device 16, such as a HDD, is also connected to the bus 99.

As input/output devices, the write data duplication module 90 may include a display device serving as an example of an output device, and a keyboard, a mouse, or the like serving as examples of an input device. The write data duplication module 90 may be inserted with a recording medium such as an optical disc, may include a device for reading/writing the inserted recording medium, and the device for reading/writing may be connected to the bus 97.

The programs implemented by the computer modules 15 are examples of data processing programs of technology disclosed herein. The programs implemented by the computer modules 15 are programs that cause the computer modules 15 to function as data processing devices of technology disclosed herein. A recording medium such as an optical disc stored with a program that causes the computer modules 15 to execute processing is an example of a recording medium of technology disclosed herein.

Explanation next follows regarding operation of the first exemplary embodiment.

Figure 8:
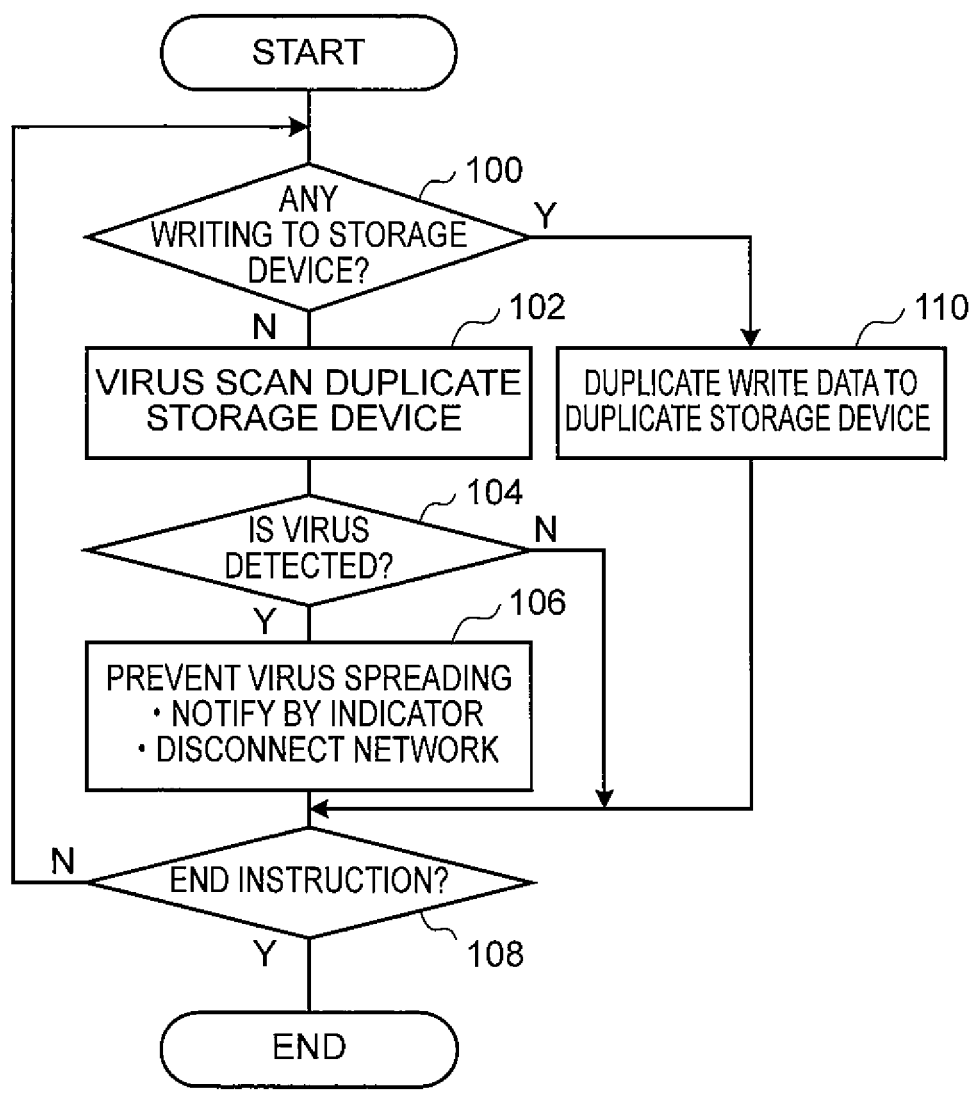
FIG. 8 is an illustrative diagram illustrating an example of flow of operation of a virus detection storage device.

FIG. 8 illustrates a flow of operation of the virus detection storage device 14 (FIG. 1) implemented by the computer modules 15 (FIG. 7).

At step 100, the virus detection storage device 14 determines whether or not there is write processing to the storage device 16. Negative determination is made at step 100 when there is no write processing to the storage device 16, and at step 102, virus scanning processing is conducted, serving as an example of virus countermeasure processing for the duplicate storage device 36. Next, at step 104 determination is made as to whether or not a virus is detected in the duplicate storage device 36 by the virus scanning processing.

Negative determination is made at step 104 when a virus is not detected in the duplicate storage device 36, processing transitions to step 108, and determination is made as to whether or not an operation end instruction for the virus detection storage device 14, such as a power-off, is issued. When the determination at step 108 is affirmative, the operation of the virus detection storage device 14 is ended. Processing returns to step 100 when the determination at step 108 is negative, and operation of the virus detection storage device 14 continues.

Determination of step 104 is affirmative when a virus is detected in the duplicate storage device 36, and virus spread prevention processing is executed at step 106. The virus spread prevention processing is processing such as causing the indicator 38 to operate in order to notify that a virus is detected, and causing the network disconnection section 39 to operate, thereby rendering network devices unusable by, for example, prohibiting operation of the communication controller 69.

Determination at step 100 is affirmative when there is write processing to the storage device 16, and at step 110, write data is duplicated by the write data duplication section 34, the write data is also stored in the duplicate storage device 36, and processing transitions to step 108.

As described in more detail below, when write processing to the storage device 16 occurs during virus scanning processing, the virus scanning processing is suspended, and the virus scanning processing is resumed after execution of the write processing.

In the first exemplary embodiment, the duplicate storage device 36 is independent of the storage device 16, but stores the same content as the storage device 16. Conducting virus scanning on the duplicate storage device 36 storing the same content as the storage device 16 enables the storage device 16 to be used to carry out normal business processing, and suppresses performance degradation caused by the virus countermeasure processing. Writing is duplicated to the duplicate storage device 36 with writing to the storage device 16 prioritized, and virus scanning is conducted on the duplicate storage device 36, such that up-to-date data written to the storage device 16 is also subjected to virus scanning.

Further explanation next follows regarding the processing in the virus detection storage device 14. First, explanation follows regarding processing of the virus detector 30 (FIG. 2) implemented by the virus detection module 70 (FIG. 7). The up-to-date virus pattern update file is pre-stored with the same content in the storage device 16 and the duplicate storage device 36 (see FIG. 6). In an initial state, the virus detector 30 possesses the virus pattern update file.

Figure 9:
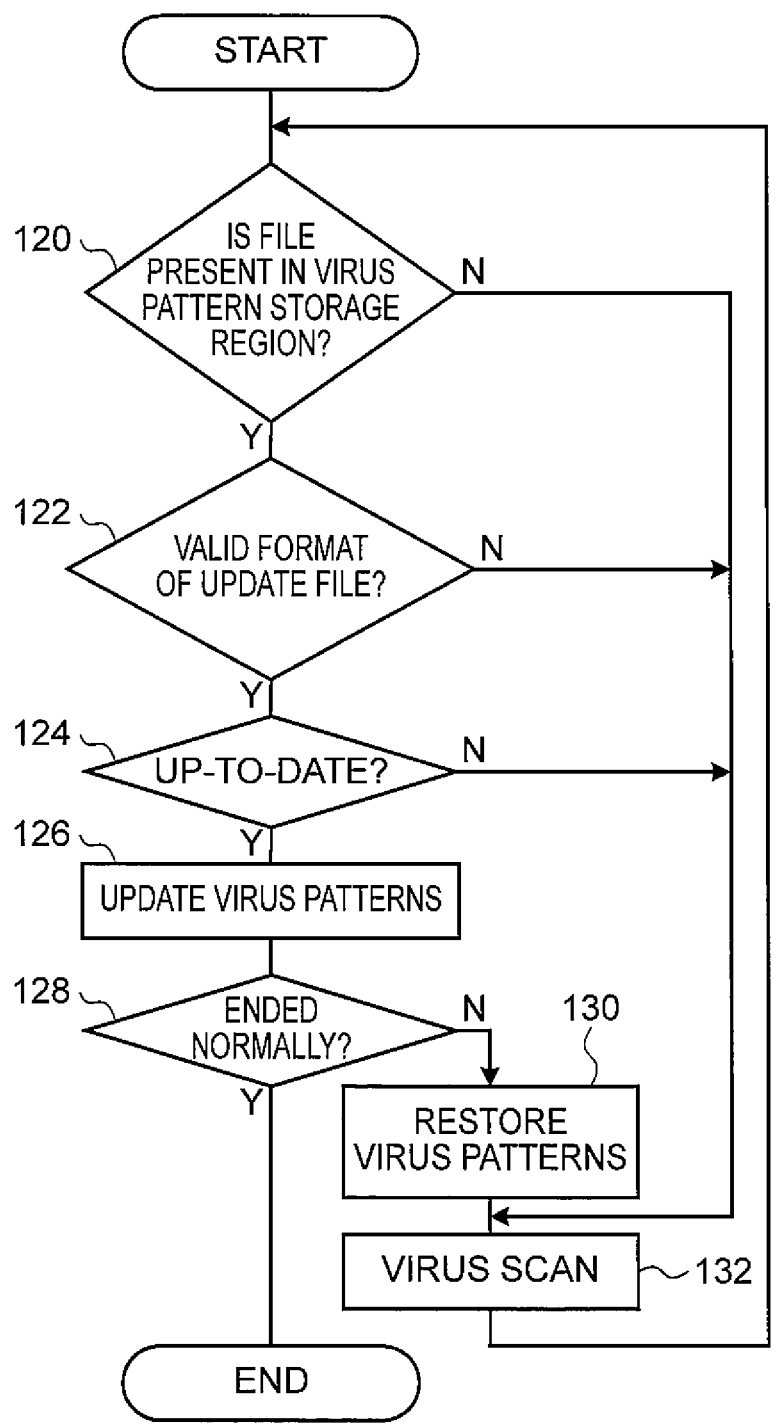
FIG. 9 is a flowchart illustrating an example of flow of processing of a virus detection module.

FIG. 9 illustrates a flow of processing in the virus detection module 70. The processing routine illustrated in FIG. 9 is executed in the virus detection module 70 at a specific time interval. First, at step 120 the MPU 72 determines whether or not the virus pattern update file storage region 37 and the virus pattern update file 37P are present in the duplicate storage device 36. When negative determination is made at step 120, the MPU 72 transitions to processing of step 132 since an update of the virus pattern update file 37P is unnecessary. When the virus pattern update file 37P is present in the virus pattern update file storage region 37 of the duplicate storage device 36, the determination of step 120 is affirmative and the MPU 72 transitions to processing of step 122.

At step 122, the MPU 72 reads the content of the virus pattern update file 37P, and determines whether or not the content of the virus pattern update file 37P is valid virus pattern update file content. If the determination of step 122 is negative, the MPU 72 transitions to processing of step 132 in order to virus scan using the pre-update virus pattern update file having valid content. The determination of step 122 is affirmative when the content of the read virus pattern update file 37P is valid as a virus pattern update file, and the MPU 72 transitions to processing of step 124.

At step 124, the MPU 72 determines whether or not the virus pattern update file 37P is up-to-date. If the determination of step 124 is negative, the MPU 72 transitions to processing of step 132. The determination of step 124 is affirmative when the read virus pattern update file 37P is up-to-date, and the MPU 72 transitions to processing of step 126.

At step 126, the MPU 72 copies the virus pattern update file 37P to the flash ROM 78, and starts virus pattern update processing. In the virus pattern update processing, the virus pattern update file 37P of that point in time becomes a backup file. The virus pattern update file 37P stored in the duplicate storage device 36 is copied to the flash ROM 78 as the up-to-date virus pattern update file 37P. When virus pattern update processing has ended, next, at step 128 the MPU 72 determines whether or not the virus pattern update processing ended normally. When the virus pattern update processing has ended normally, the determination of step 128 is affirmative, and the MPU 72 ends the present processing routine.

When the virus pattern update processing does not end normally, failed virus pattern update processing is identified, the determination of step 128 is negative, and the MPU 72 transitions to processing of step 130. At step 130, the MPU 72 executes processing that restores the virus pattern update file 37P. Namely, at step 126 the virus pattern update file 37P stored as the backup file immediately prior to updating is made the up-to-date virus pattern update file 37P on the flash ROM 78.

Next, at step 132 the MPU 72 employs the up-to-date virus pattern update file 37P, executes the virus scanning processing, and returns processing to step 120.

Explanation next follows regarding processing of the write data duplication section 34 (FIG. 2) implemented by the write data duplication module 90 (FIG. 7). When there is an access request made to the storage device 16 from the storage device controller 24, data is duplicated by the distributor 42 (FIG. 3). Namely, as illustrated in FIG. 7, the data output from the I/O controller 68 of the computer 60 is output to the storage device 16 and the bus 97 of the write data duplication module 90 through the bus 99.

Figure 10:
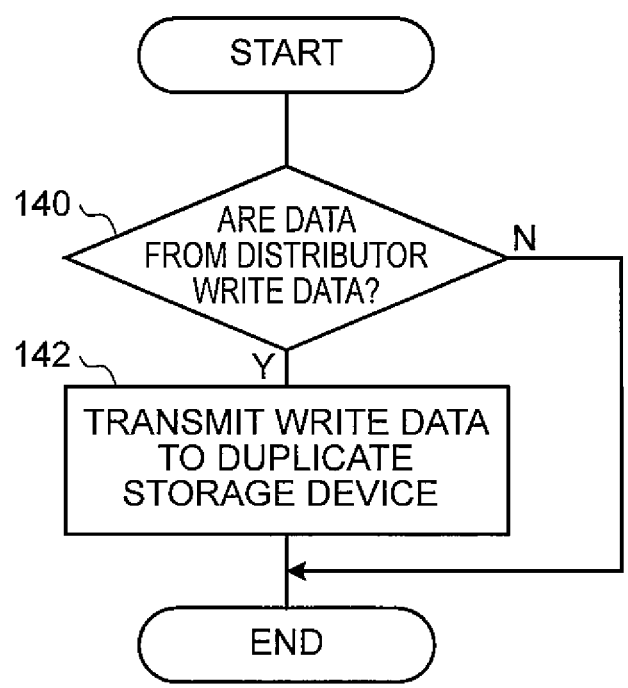
FIG. 10 is a flowchart illustrating an example of flow of processing of a write data duplication module.

FIG. 10 illustrates the flow of the processing in the write data duplication module 90. The processing routine illustrated in FIG. 10 is executed in the write data duplication module 90 at a specific time interval. The processing routine of the write data duplication module 90 illustrated in FIG. 10 corresponds to the function of the write data selector 40 illustrated in FIG. 3.

First, at step 140 the MPU 92 determines whether or not data output from the distributor 42 is write data. If the determination of step 140 is negative, the MPU 92 ends the present processing routine. If the determination of step 140 is affirmative, at step 142 the MPU 92 outputs the write data output from the distributor 42 to the duplicate storage device controller module 80, and ends the present processing routine. Accordingly, of the data output from the I/O controller 68 of the computer 60, data not contributing to writing is discarded, and only write data is output to the duplicate storage device controller 32.

Explanation next follows regarding the processing of the duplicate storage device controller 32 (FIG. 2) implemented by the duplicate storage device controller module 80 (FIG. 7).

Figure 11:
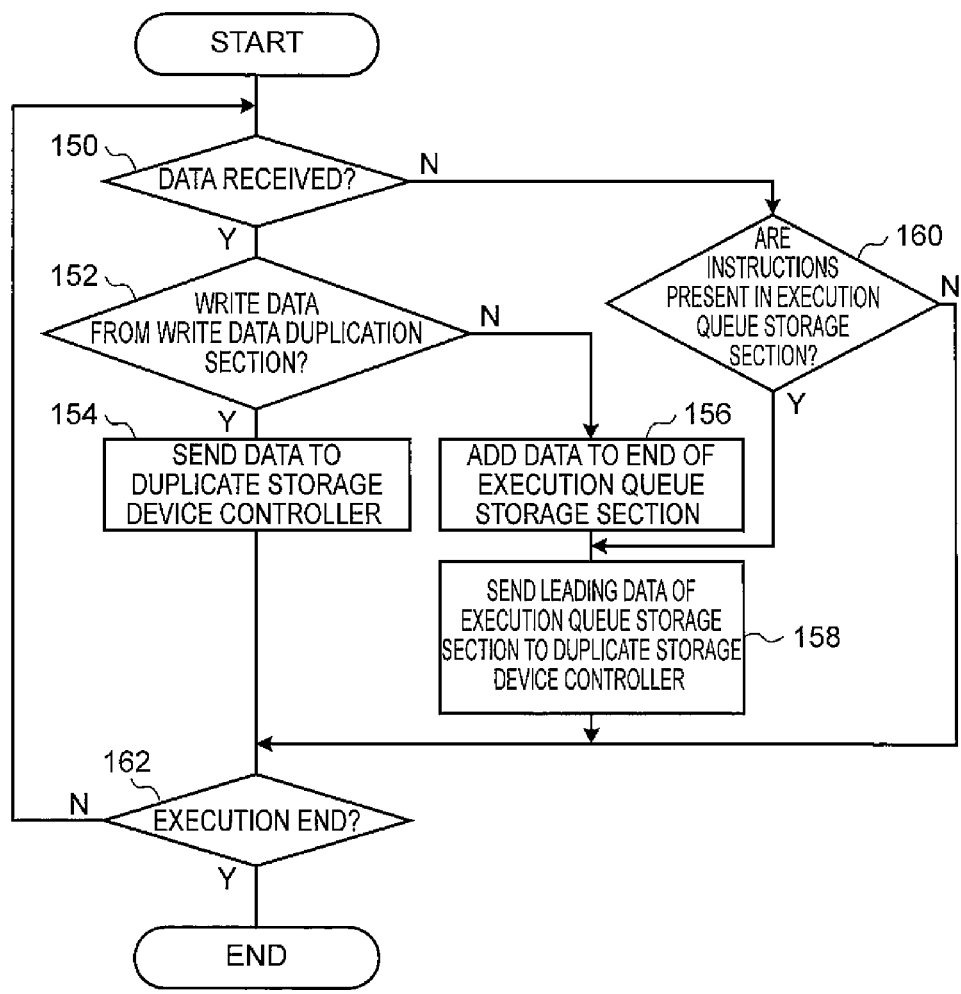
FIG. 11 is a flowchart illustrating an example of flow of processing of a duplicate storage device controller.

FIG. 11 illustrates a flow of processing of the duplicate storage device controller 32 implemented by the duplicate storage device controller module 80. The processing routine illustrated in FIG. 11 is executed at a specific time interval in the duplicate storage device controller module 80. The processing routine illustrated in FIG. 11 is processing that processes data from the write data duplication section 34 with priority such that the content of the storage device 16 is rapidly reflected in the duplicate storage device 36. The processing routine illustrated in FIG. 11 corresponds to the function of the priority sequence determination section 44 illustrated in FIG. 4.

Explanation follows of a case in which data representing write instructions is input as write data output from the write data duplication section 34, and data representing read instructions is input as data from the virus detector 30, to the duplicate storage device controller 32. In the first exemplary embodiment, write processing is accordingly processed with priority over read processing, by storing read instructions to the execution queue storage section 46 and then processing the read instructions, without employing the execution queue storage section 46 for write instructions.

First, at step 150 the MPU 82 determines whether or not data are received from the write data duplication section 34 or the virus detector 30. When data has been received, the determination of step 150 is affirmative, and at step 152 the MPU 82 determines whether or not the received data is write data from the write data duplication section 34. When write data is received from the write data duplication section 34, the determination at step 152 is negative, and at step 154 the MPU 82 outputs the data representing the write data, namely, the write instructions, to the duplicate storage device controller 48, and transitions to processing of step 162. At step 162 the MPU 82 determines whether or not execution end instruction for the virus detection storage device 14, such as power-down, is performed. If the determination of step 162 is affirmative, the MPU 82 ends the present processing routine. If the determination of step 162 is negative, the MPU 82 returns the processing to step 150.

Determination of step 152 is negative when data received at step 150 is not write data from the write data duplication section 34, and at step 156 the MPU 82 appends the received data to the end of the execution queue storage section 46. Next, at step 158 the MPU 82 outputs the leading data of the execution queue storage section 46, namely, the data representing read instructions, to the duplicate storage device controller 48, and transitions processing to step 162.

Determination of step 150 is negative when data is received from neither the write data duplication section 34 nor the virus detector 30 in the duplicate storage device controller 32, and the MPU 82 transitions to processing of step 160. At step 160 the MPU 82 determines whether or not the data is present in the execution queue storage section 46, namely, the data representing read instructions. If the determination at step 160 is an affirmative confirmation result from the execution queue storage section 46, the MPU 82 advances processing to step 158, and if the determination at step 160 is negative, the MPU 82 advances processing to step 162.

Accordingly, when the priority sequence determination section 44 does not receive data, instructions stored in the execution queue storage section 46 are confirmed, and when instructions are present, the leading instructions stored in the execution queue storage section 46 are output to the duplicate storage device controller 48. When instructions are not present in the execution queue storage section 46, processing stands-by for data reception. When data is received, the data is discriminated as write data or not write data from the write data duplication section 34, and when discriminated as being write data from the write data duplication section 34, instructions are output to the duplicate storage device controller 48. If the data is not write data from the write data duplication section 34, the instructions are appended to the end of the execution queue storage section 46, and after executing the leading instructions of the execution queue storage section 46, processing returns to stand-by processing.

FIG. 12 illustrates a state of the execution queue storage section 46 when processing the priority sequence determination section 44. FIG. 12 explains an example case in which instructions are received by the priority sequence determination section 44 in the following order: write instruction (A), read instruction (B), write instruction (C), read instruction (D), and read instruction (E). Note that read instruction (B) is received during execution of write instruction (A), write instruction (C) is received during execution of read instruction (B), and read instruction (D) is received during execution of write instruction (C). Execution in the priority sequence determination section 44 is performed in the following order: write instruction (A), write instruction (C), read instruction (B), read instruction (D), read instruction (E).

As explained above, in the first exemplary embodiment, virus countermeasure processing, such as virus scanning, is conducted on the duplicate storage device 36 that holds the same content as the storage device 16. Data input/output for business processing and data input/output for virus countermeasure processing are therefore not in competition in the storage device 16. Performance degradation is accordingly suppressed.

In the first exemplary embodiment, when write processing to the storage device 16 occurs during virus countermeasure processing conducted on the duplicate storage device 36, virus countermeasure processing on the duplicate storage device 36 is suspended, priority is given to writing of content to the storage device 16, then duplicated in the duplicate storage device 36. Since up-to-date data is always stored in the duplicate storage device 36, discrepancies between the data of the storage device 16 and the duplicate storage device 36 are accordingly suppressed by virus countermeasure processing on the duplicate storage device 36.

In the first exemplary embodiment, since write data for the storage device 16 is duplicated and the data is written to the duplicate storage device 36, write processing on the storage device 16 is isolated from write processing on the duplicate storage device 36. Increases in processing load for write processing to the storage device 16 in business processing, and degradation in performance are accordingly suppressed.

Although, in the first exemplary embodiment, explanation has been given of a case employing the execution queue storage section 46 in priority sequence determination processing, write processing may be prioritized by adopting a busy state without employing the execution queue storage section 46, and without receiving read signals during write processing.

Although, in the first exemplary embodiment, explanation has been given of an example of a case in which a computer is the target device of the virus detection storage device 14, the type of computer is not limited. For example, the computer may be a personal computer, a smart phone, or another computer applied as an embedded system.

Although, in the first exemplary embodiment, explanation has been given of an case in which, as an example, the storage device 16 and the duplicate storage device 36 apply a HDD, there is no limitation to a HDD; a solid state drive (SSD), serial flash memory, or the like may be applied.

Although, in the first exemplary embodiment, explanation has been given of a case in which the duplicate storage device 36 is internally installed to the virus detection storage device 14, the duplicate storage device 36 is not limited to internal installation in the virus detection storage device 14. For example, the duplicate storage device 36 may be provided externally connected to the virus detection storage device 14.

Second Exemplary Embodiment

Explanation next follows regarding a second exemplary embodiment. In the first exemplary embodiment, explanation was given regarding a case in which the virus detector 30, the duplicate storage device controller 32, and the write data duplication section 34 included in the virus detection storage device 14 are implemented by respective computer modules. In the second exemplary embodiment, the virus detector 30 and the duplicate storage device controller 32 are implemented by a single computer module. In the second exemplary embodiment, since configuration is substantially similar to that of the first exemplary embodiment, the same reference numerals are appended, and detailed explanation thereof is omitted.

Figure 13:
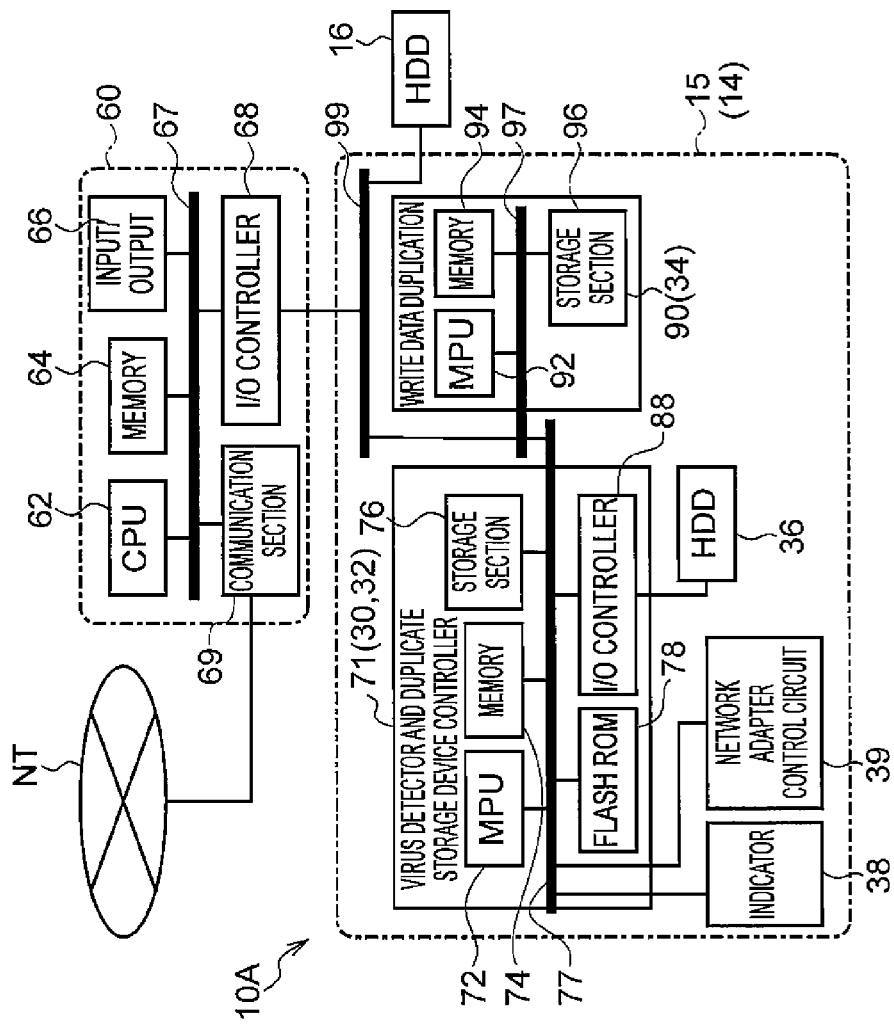
FIG. 13 is a block diagram illustrating an example of a data processing system according to a second exemplary embodiment.

FIG. 13 illustrates an example of a case in which a data processing system 10A according to the second exemplary embodiment is implemented by a computer system including a computer. A computer module 71 of the data processing system 10A illustrated in FIG. 13 is a combination of the virus detection module 70 and the duplicate storage device controller module 80 of the data processing system 10, illustrated in FIG. 7.

In more detail, the computer module 71 includes the MPU 72, the memory 74, and the non-volatile storage section 76. The MPU 72, the memory 74, and the storage section 76 are mutually connected through the bus 77. The storage section 76 stores a virus detection program and a duplicate storage device control program, and is implemented by a HDD, flash memory, or the like. The computer module 71 also includes the flash ROM 78 and the I/O controller 88.

As explained above, in the second exemplary embodiment, the virus detection module 70 and the duplicate storage device controller module 80 are combined, and the MPU 72 and the MPU 82, the memory 74 and the memory 84, and the storage section 76 and the storage section 86 are implemented by the MPU 72, the memory 74, and the storage section 76 alone, thereby simplifying the configuration of the computer module.

According to related arts, computer performance is sometimes reduced even when a device provided with a CPU and memory, separate from the hardware resources of the computer, is employed for virus countermeasure processing. For example, when the target storage device that executes virus countermeasure processing is the same storage device as that employed in business processing, competition arises in the storage device during virus countermeasure processing, causing a reduction in computer performance.

Computer performance is sometimes degraded even when a normal volume and an ancillary-volume in a storage device are separated, and virus countermeasure processing executes on the ancillary-volume. For example, the content of the storage device is not synchronized between the paired normal volume and ancillary-volume during virus countermeasure processing, and the virus countermeasure processing is therefore inadequate for the data written to the normal volume. For example, when data of the storage device used in virus countermeasure processing is duplicated using storage device mirroring, processing other than the business processing is created, this being processing to duplicate the data, increasing the load on the storage device. In storage device mirroring technology, since the storage device that is subject to reading is not separable by application, sometimes competition arises during virus countermeasure processing, reducing computer performance.

On the other hand, according to technology disclosed herein, virus countermeasure processing executes without degrading computer performance.

An example has been explained in which the data processing system 10 is implemented by the computer 60. However, there is no limitation to these configurations, and various improvements and modifications may be made within a range not exceeding the spirit of the explanation.

Moreover, although explanation has been given above of cases in which the programs described are pre-stored (installed) in a storage section, there is no limitation thereto. For example, it is possible to provide data processing programs of technology disclosed herein in a format recorded on a recording medium such as a CD-ROM or a DVD.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing device, comprising:
   a first storage device; and
   a processor configured to execute a procedure, the procedure comprising:
      receiving current write data to be written to a second storage device provided at a computer, outputting the current write data to the second storage device, and duplicating and outputting the current write data;
      executing control that writes the duplicated current write data to the first storage device that is separate from the second storage device;
      executing virus countermeasure processing related to virus infection, on the current write data stored in the first storage device; and
      when the current write data is output during the virus countermeasure processing, suspending the virus countermeasure processing and prioritizing execution of the control that writes the duplicated current write data to the first storage device,
   wherein the duplicating and outputting of the current write data includes:
      receiving read data indicating reading of data from the second storage device, outputting the received read data or the received current write data to the second storage device, and duplicating and outputting the received read data or the received current write data; and
      selectively outputting the current write data from out of the received read data or the received current write data.

2. The data processing device of claim 1, wherein the prioritizing of execution of the control that writes to the first storage device includes:
   executing the virus countermeasure processing corresponding to execution instructions stored in an execution queue that stores time-sequenced execution instructions for the virus countermeasure processing to be executed on the current write data, according to the time sequence, and, when the current write data is output during the virus countermeasure processing, suspending the virus countermeasure processing and then resuming the suspended virus countermeasure processing after the control that writes the duplicated current write data to the first storage device has been executed.

3. The data processing device of claim 1, wherein the prioritizing of execution of the control that writes to the first storage device includes:
   when the current write data is output during the virus countermeasure processing, suspending the virus countermeasure processing, and continuing the suspension of the virus countermeasure processing until the control that writes the duplicated current write data to the first storage device has ended.

4. The data processing device of claim 1, wherein the executing of the virus countermeasure processing includes:
   notification of processing results of the virus countermeasure processing related to the virus infection.

5. A method for controlling a data processing device, the data processing device including a second storage device that stores current write data, the method comprising:
   receiving, by a duplicate output section included in the data processing device, current write data , and outputting the current write data to the second storage device, and duplicating and outputting the current write data;
   executing, by a controller included in the data processing device, control that writes the duplicated current write data that are duplicated by the duplicate output section to a first storage device that is separate from the second storage device;
   executing, by a countermeasure processor in the data processing device, virus countermeasure processing related to virus infection, on the current write data stored in the first storage device; and
   when the duplicated current write data is output from the duplicate output section during the virus countermeasure processing, suspending, by a priority processor included in the data processing device, the virus countermeasure processing by the countermeasure processor and prioritizing execution of the control that writes the duplicated current write data that are duplicated in the duplicate output section to the first storage device,
   wherein the duplicating and outputting of the current write data includes:
      receiving read data indicating reading of data from the second storage device, outputting the received read data or the received current write data to the second storage device, and duplicating and outputting the received read data or the received current write data; and
      selectively outputting the current write data from out of the received read data or the received current write data.

6. The data processing method of claim 5, wherein the prioritizing of execution of the control that writes to the first storage device includes:
  executing the virus countermeasure processing corresponding to execution instructions stored in an execution queue that stores time-sequenced execution instructions for the virus countermeasure processing to be executed on the current write data, according to the time sequence, and, when the duplicated current write data is output during the virus countermeasure processing, suspending the virus countermeasure processing and then resuming the suspended virus countermeasure processing after the control that writes the duplicated current write data to the first storage device has been executed.

7. The data processing method of claim 5, wherein the prioritizing of execution of the control that writes to the first storage device includes:
  when the duplicated current write data is output during the virus countermeasure processing, suspending the virus countermeasure processing, and continuing the suspension of the virus countermeasure processing until the control that writes the duplicated current write data to the first storage device has ended.

8. The data processing method of claim 5, wherein the executing of the virus countermeasure processing includes:
  notification of processing results of the virus countermeasure processing related to the virus infection.

9. A non-transitory recording medium storing a program that causes a first computer to execute a process, the process comprising:
  receiving current write data to be written to a second storage device provided at a second computer, outputting the current write data to the second storage device, and duplicating and outputting the current write data;
  executing control that writes the duplicated current write data to a first storage device that is separate from the second storage device;
  executing virus countermeasure processing related to virus infection, on the current write data stored in the first storage device; and
  when the duplicated current write data is output during the virus countermeasure processing, suspending the virus countermeasure processing and prioritizing execution of the control that writes the duplicated current write data to the first storage device, wherein the duplicating and outputting of the current write data includes:
  receiving read data indicating reading of data from the second storage device, outputting the received read data or the received current write data to the second storage device, and duplicating and outputting the received read data or the received current write data; and
  selectively outputting the current write data from out of the received read data or the received current write data.

10. The non-transitory recording medium of claim 9, wherein the prioritizing of execution of the control that writes to the first storage device includes:
  executing the virus countermeasure processing corresponding to execution instructions stored in an execution queue that stores time-sequenced execution instructions for the virus countermeasure processing to be executed on the current write data, according to the time sequence, and, when the duplicated current write data is output during the virus countermeasure processing, suspending the virus countermeasure processing and then resuming the suspended virus countermeasure processing after the control that writes the duplicated current write data to the first storage device has been executed.

11. The non-transitory recording medium of claim 9, wherein the prioritizing of execution of the control that writes to the first storage device includes:
  when the duplicated current write data is output during the virus countermeasure processing, suspending the virus countermeasure processing, and continuing the suspension of the virus countermeasure processing until the control that writes the duplicated current write data to the first storage device has ended.

12. The non-transitory recording medium of claim 9, wherein the executing of the virus countermeasure processing includes:
  notification of processing results of the virus countermeasure processing related to the virus infection.

13. The data processing device of claim 1, wherein the suspending the virus countermeasure processing and the prioritizing execution of the control that writes the duplicated current write data to the first storage device occurs only when the current write data is output during the virus countermeasure processing.

14. The data processing method of claim 5, wherein the suspending, by the priority processor included in the data processing device, the virus countermeasure processing by the countermeasure processor and the prioritizing execution of the control that writes the duplicated current write data that are duplicated in the duplicate output section to the first storage device when the duplicated current write data is output from the duplicate output section during the virus countermeasure processing.

15. The non-transitory recording medium of claim 9, wherein the suspending the virus countermeasure processing and the prioritizing execution of the control that writes the duplicated current write data to the first storage device occurs only when the current write data is output during the virus countermeasure processing.

* * * * *